May 13, 1952  S. B. LINDSEY  2,596,158
TAPE DISPENSING
Filed Dec. 27, 1948  4 Sheets-Sheet 1
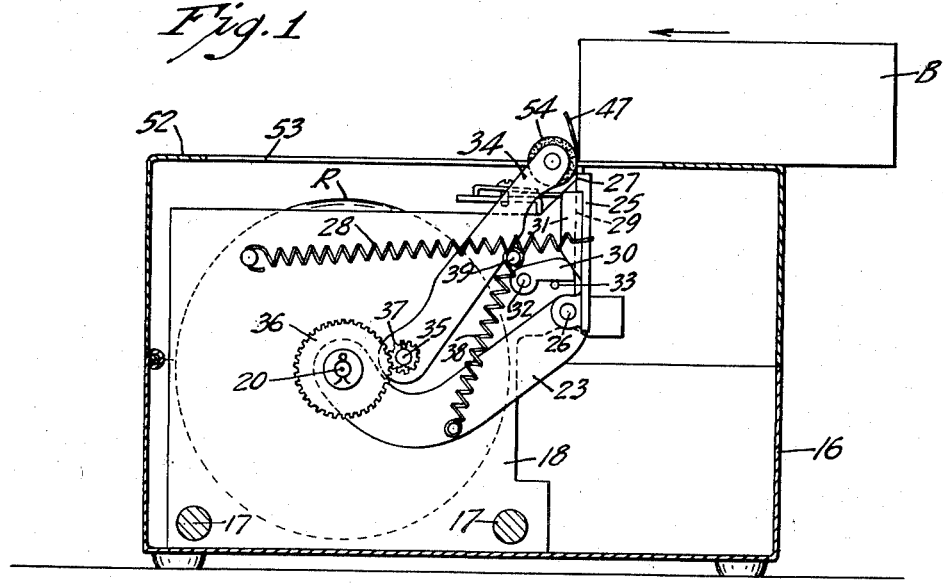
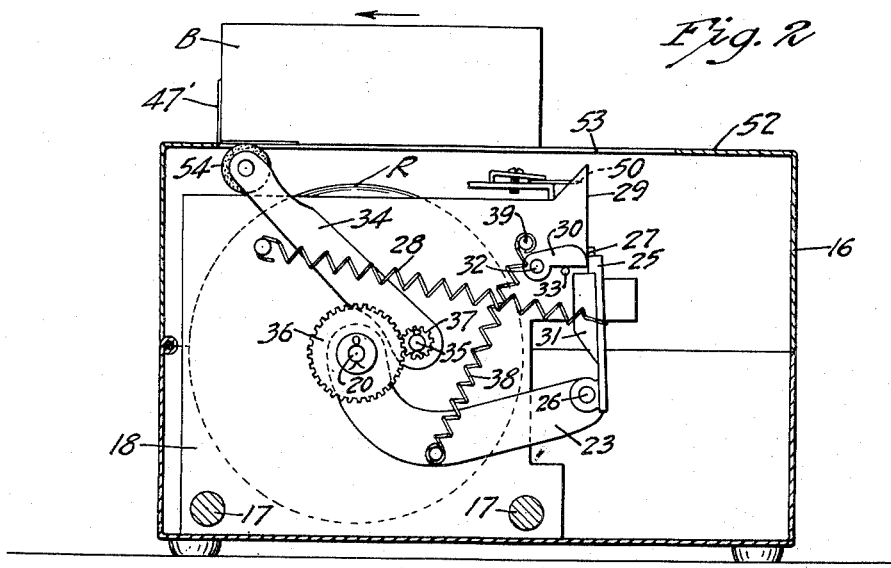
Inventor
Seth B. Lindsey
Attorneys May 13, 1952  S. B. LINDSEY  2,596,158
TAPE DISPENSING
Filed Dec. 27, 1948  4 Sheets-Sheet 2
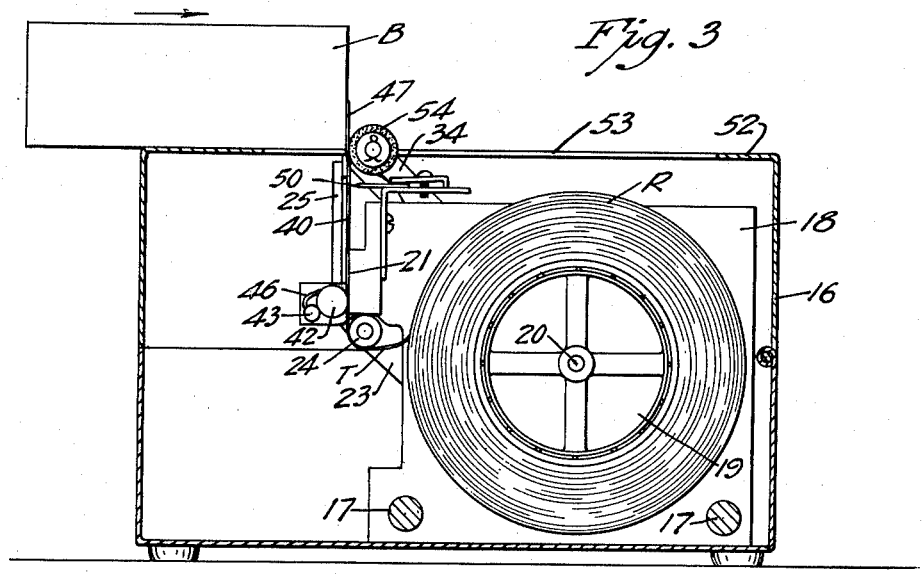
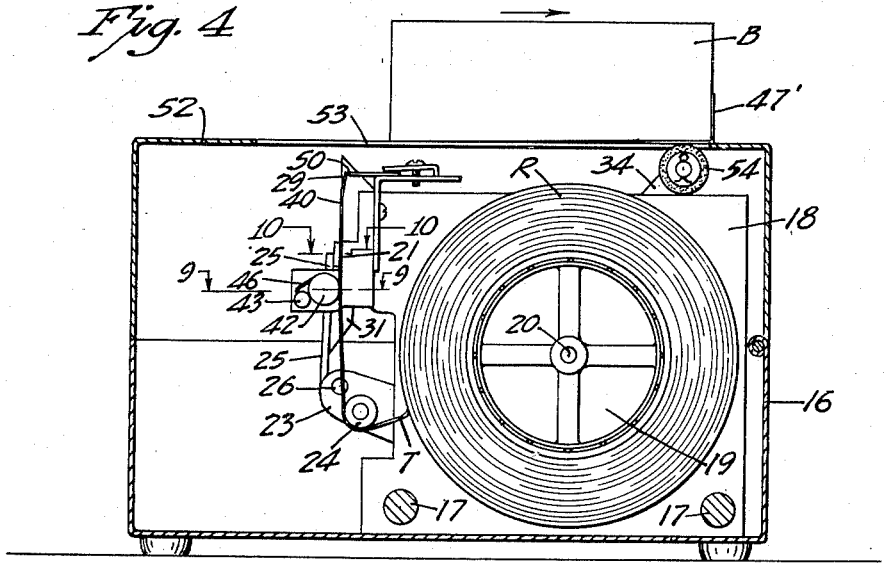
Inventor
Seth B. Lindsey
By Carpenter Abbott Coulter & Kinney
Attorneys May 13, 1952  S. B. LINDSEY  2,596,158
TAPE DISPENSING
Filed Dec. 27, 1948  4 Sheets-Sheet 3
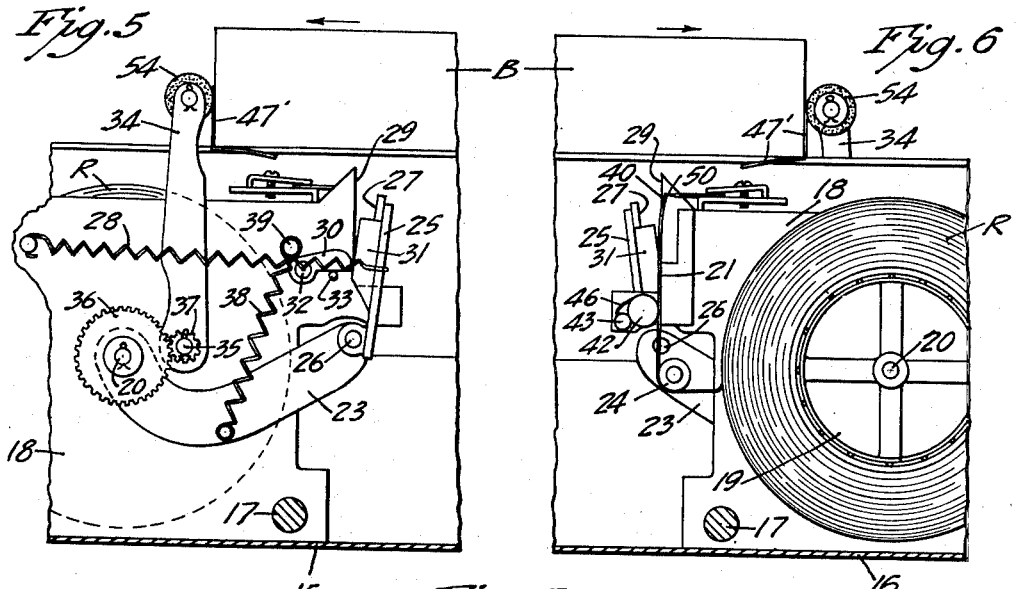
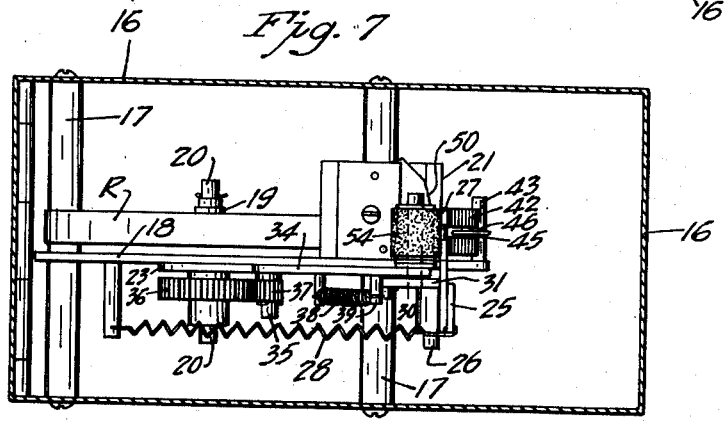
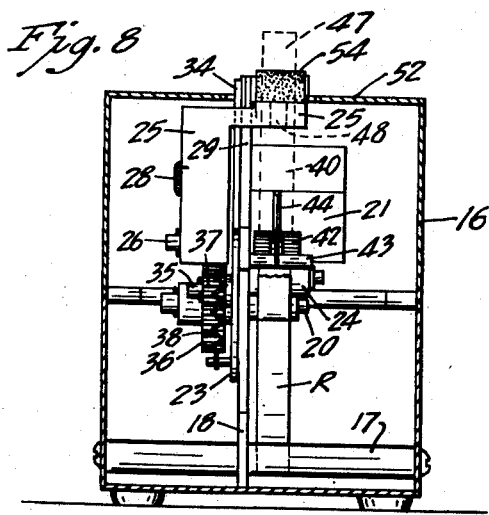
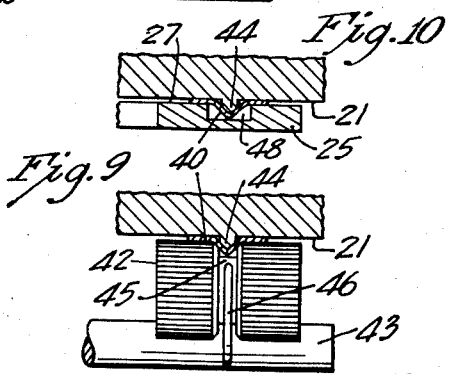
Inventor
Seth B. Lindsey
By
Attorneys May 13, 1952  S. B. LINDSEY  2,596,158
TAPE DISPENSING
Filed Dec. 27, 1948  4 Sheets-Sheet 4

Inventor
Seth B. Lindsey
By
Attorneys

Patented May 13, 1952

2,596,158

UNITED STATES PATENT OFFICE 2,596,158

TAPE DISPENSING

Seth B. Lindsey, Anoka, Minn., assignor to Minnesota Mining & Manufacturing Company, St. Paul, Minn., a corporation of Delaware Application December 27, 1948, Serial No. 67,267

13 Claims. (Cl. 216—21)

This invention relates to pressure-sensitive adhesive tape dispensers and to pressure-sensitive adhesive tape appliers.

Manual machines, as distinguished from power driven machines, and particularly appliers that are powered by the force of a moving article being taped, such as the object-powered appliers of the Anderson Patent No. 2,407,641 and the Salfisberg Reissue Patent No. 22,418, are sometimes limited in respect to the kind of article that can be taped. For example, if the article is a box, the walls of the box must have a certain degree of strength to withstand the pressure that is exerted against them in the operation of such prior machines.

Accordingly, one objective of this invention is the provision of a mechanism that will require relatively little power for withdrawal of pressure-sensitive adhesive tape from the standard commercial forms of supply rolls in which it usually comes.

The present invention provides inter alia, a mechanism or movement having a means for anchoring a previously withdrawn unsevered length of tape, and a movable tape withdrawing member which contacts the tape at a point between the anchoring means and the tape supply. The said member (preferably a roller) withdraws the tape by being thrust against it while the tape is anchored, thereby forming a progressively increasing bight or loop of tape against the inside of which the member continues to bear until additional tape in desired amount has been withdrawn from the supply. Thereafter a tape advancing means operates to draw and/or to project the previously withdrawn tape past the anchor into a desired position in readiness for use, the anchor being at the same time disengaged or released to permit the said advancement.

Preferably the mechanism is assembled so as to operate by reciprocation, a movement in one direction operating to move the tape withdrawing member through the tape withdrawing stroke, the return movement operating to advance the withdrawn tape.

An illustrative embodiment is described herein and illustrated in the attached drawings in which:

Figure 1 is a left side elevation with the parts in normal starting position;

Figure 2 is a left side elevation showing the position of the parts at the end of a tape withdrawing stroke;

Figure 3 is a right side elevation with the parts in normal starting position;

Figure 4 is a right side elevation showing the position of the parts at the end of a tape withdrawing stroke;

Figures 5 and 6 are left and right side elevations, respectively, of certain parts showing their position during a tape withdrawing stroke;

Figure 7 is a plan view;

Figure 8 is a front elevation;

Figures 9 and 10 are horizontal sectional views on the lines 9 and 10, respectively, in Figure 4.

Figure 11:
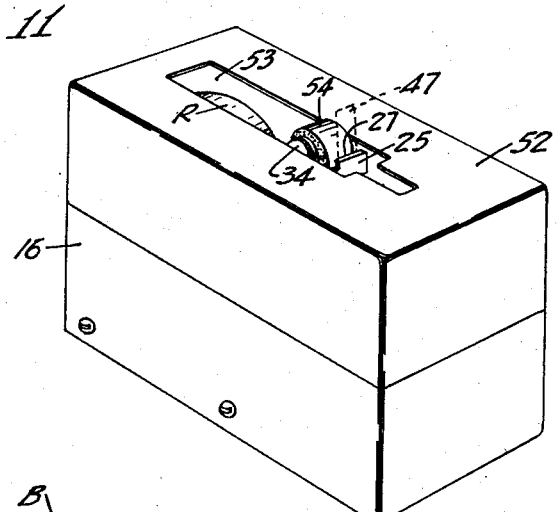
Figure 12:
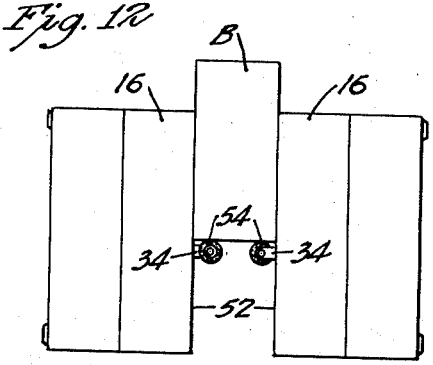

Figure 11 is a perspective view;

Figure 12 shows two machines together; and

Figure 13:
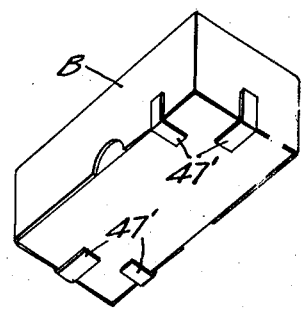

Figure 13 shows a sealed box.

Figure 14:
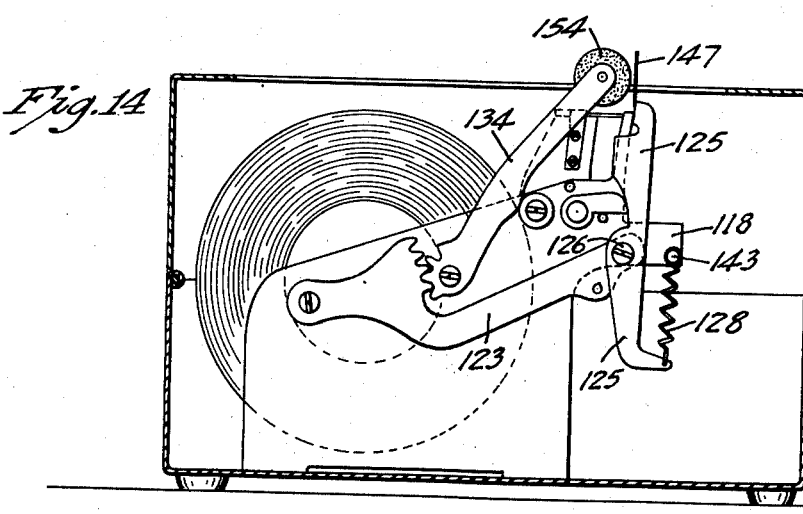

Figure 14 is a left side elevation of another embodiment.

In all views except Figures 11 and 12, the casing is broken away so as to shown the working parts.

A casing 16, having a hinged upper portion, encloses the working parts and it also serves to support them by means of rigid shafts 17 which extend from side to side of the casing and which support the machine frame 18.

A drum 19 for holding a supply roll R of normally tacky pressure-sensitive adhesive tape T, is rotatably mounted near the rear of the machine on a fixed horizontal shaft 20 which extends through the frame 18.

A platen having a vertical planar face 21 on its forward side is fixed to the forward portion of the frame in front of the supply drum 19.

A reciprocating arm 23 is mounted for oscillation about the fixed drum shaft 20 from whence it extends forwardly.

Near its front end the arm 23 carries a rotatable tape withdrawing roller member 24 under which a previously withdrawn unsevered length of tape T passes as it extends from the supply roll R to the platen 21.

Near its front end and forwardly of the platen face 21, the arm 23 carries a vertically disposed tape gripping finger 25 whose lower end is pivoted to the arm at 26 and which has a tape gripper at its upper free end in the form of a vertically disposed tape gripping surface 27 (Figure 5) that holds the tape by reason of the tape's temporary adherence thereto. The finger 25 here has the shape of an inverted letter L (Figure 8) with the tape gripping surface 27 located on the rear side and toward the end of the horizontal portion of the L (Figure 7).

A spring 28 impels the finger rearwardly into contact with the forward vertical end or edge 29 of the frame 18, the parts being of such shape and position that the tape gripping surface 27 normally bears against the tacky side of the portion of the tape that extends across the face 21 of the platen and upwardly therefrom.

A finger cam 30 and a cam rider 31, which latter is on the rear of the finger 25, coact in a manner hereinafter described to move the finger forwardly (outwardly) away from its said normal position during the downward stroke of the arm 23. The cam 30 is freely pivoted to the frame 18 at 32. Its downward movement is limited by a stop pin 33.

The arm 23, which thus provides a means for effecting reciprocal movement of the tape withdrawing roller 24 and the tape gripper 27, is oscillated or reciprocated in a generally vertical direction about its pivot 20 by an operating lever 34 which is mounted for oscillation about a shaft 35 that is fixed to the frame 18. A gear 36 which is fixed to the arm 23 concentrically with the shaft 20, and a spur 37 which is fixed to the lever 34 concentrically with the shaft 35, form an operative connection between the operating lever and the reciprocating means. Movement of the lever 34 rearwardly moves the arm 23 downwardly through a "tape withdrawing stroke." A spring 38 returns the lever 34 forwardly and the arm 23 upwardly through a "tape advancing stroke" until the lever 34 strikes a stop pin 39.

Means for temporarily anchoring the advance portion 40 of the previously withdrawn unsevered length of tape against retraction during a tape withdrawing stroke, is provided in the form of an anchoring roller 42 adjacent the face 21 of the platen. A roller-seating member in the form of a short round horizontal shaft 43 is positioned in front of the platen face 21, spaced therefrom and parallel thereto. The tape anchoring roller 42 which is of a diameter greater than the space between the retaining shaft 43 and the platen face 21, is seated against the said shaft and the said face in the space between the shaft and face. The roller is confined laterally by a vertical ridge 44 on the platen face 21, there being a groove 45 in the roller's periphery into which the ridge extends, the roller being thus shaped to accommodate the ridge. The roller 42 is free to move upwardly and downwardly above its said seat.

The anchoring roller 42 is impelled downwardly into its seat by downward movement of the tape together with the pressure of a spring 46, thereby wedging the tape between the roller and the platen face 21 and stopping further downward movement. Upward movement of the tape impels the roller upwardly and unseats it, thereby removing its wedging action so that the tape is free to pass in that direction.

Thus a downward movement of the arm 23 through a tape withdrawing stroke (which, by reason of the downward pressure of the tape withdrawing roller 24 on the tape, causes a downward pull on the length of tape 40 that extends upwardly along the platen face) automatically sets the anchoring roller 42, and retraction of the tape from its position in front of the platen is prevented. With the tape thus held or anchored, the downward movement of the roller 24 against the tape T at a point between the anchor and the supply roll R forms a progressively increasing bight or loop of tape against the inside of which the roller 24 continues to bear until the end of the said tape withdrawing stroke, thereby withdrawing a fresh length from the supply. The length of the stroke determines the amount withdrawn.

As the said tape withdrawing stroke begins, the finger cam 30 engages the rider 31 on the downwardly moving finger 25. This causes the finger to move forwardly, and it is held in that position (Figures 5 and 6) by the cam and rider until, at the end of the tape withdrawing stroke, the rider ends, whereupon the finger is drawn rearwardly by the spring 28 (Figure 2) until the tape gripper surface 27 is thereby pressed against the platen 21 with the tape between them (Figure 4).

This gives the finger a fresh grip on the tape so that when the finger moves upwardly through the tape advancing stroke, the previously withdrawn length 40 is thrust or projected by the finger upwardly to form a projected unsevered length 47; and at the same time the withdrawn portion of tape T that extends from the supply roll R under the roller 24 to the anchor 42 and that has been withdrawn from the supply by a previous tape withdrawing stroke, is drawn upwardly by the finger until it extends across the platen face to form a new length 40 in readiness for the next dispensing cycle.

The projected length 47 may then be severed by drawing it rearwardly against a passive severing edge 50.

The above described ridge 44 on the platen face 21, and the groove 45 in the anchoring roller 42 which shapes the roller to accommodate the ridge, serve also as a tape deforming means to impart a temporary ridge, bend or fold for a short distance longitudinally along the center of the tape where the tape extends upwardly between the roller and the platen face (Figure 9), thus stiffening the tape to facilitate thrusting its free and unsupported leading end upwardly in the tape advancing operation above described and to hold the portion 40 erect after severance of the length 47. The tape gripping surface 27 on the finger 25 is, like the periphery of the anchoring roller 42, shaped in a manner to accommodate the ridge 44 by means of a vertical groove or channel 48, so that when the finger takes a fresh grip on the tape 40 at the end of a tape withdrawing stroke (Figure 4), the finger will fit the tape's longitudinally ridged deformity which it then has (Figure 10) and help to preserve the said deformity while it is moving upwardly through the tape advancing stroke and thereafter until the erect free-ended length 47 is severed and removed.

The parts thus far described provide a device for dispensing measured lengths of tape.

To provide a device which will also apply the lengths to objects, the top 52 of the casing 16 is made to serve as a guide table for the objects being taped. It is pierced with an elongate aperture 53 through which the operative lever 34 extends to a point just above or beyond the upper or outer surface of the top. A pressing means in the form of a rubber roller 54 is rotatably mounted on the end of the lever directly behind the projected unsevered length of tape 47.

Rearward movement of a box B across the guide table 52 against the pressing roller 54 with the tape 47 between the box and the roller, adheres the tape to the leading face of the box. Continued movement of the box draws the unsevered length 47 against the knife edge 50 and thereby severs it to form the cut length 47', and further movement completes the application of the cut length 47' to the leading bottom edge in a manner well known. The said movement or advancement of the box also operates the dispensing mechanism by causing the operating lever 34 to move rearwardly. The above described tape withdrawing stroke of the machine parts is thus at the same time the applying stroke; and the tape advancing stroke is at the same time the return stroke.

Thus, objects such as boxes, bags, cartons, packages, and other articles may be taped automatically with measured lengths simply by passing the object across the top of the machine, without the machine or tape having to be touched by anything except the object itself and without requiring any power other than the pressure of the moving object against the pressing roller 54. The object being sealed may be propelled or pushed across the top 52 by hand or otherwise.

Machines made in accordance with this invention have been found to operate satisfactorily with a relatively light pressure on the pressing roller 54, thus rendering them particularly well adapted to sealing objects that have fragile side walls, such for example as paper bags, light weight cardboard cartons, etc.

Numerous alternative forms and equivalents may be employed within the scope of the invention, such for example as is shown in Figure 14, where the tape gripping finger 125 is lengthened to extend downwardly below its pivot 126. A single spring 128, stretched between the lower end of the finger and an extension of the roller seating shaft 143 that is held in the frame 118, then serves the function of both the finger spring 28 and the arm spring 38. The spring 128 continuously impels the reciprocating arm 123 upwardly and the tape gripping end of the finger 125 rearwardly.

The reciprocating tape withdrawing roller 24 need not necessarily be rotatable nor need it be exactly cylindrical as long as it is a member that will withdraw the tape from the supply when thrust against the tape between the supply and the anchoring means 42. A smooth rounded member would be the equivalent of the rotatable roller 24 although the latter is preferable.

Means other than the ridge 44 on the platen face 21 and the groove 45 in the anchoring roller 42, may be employed for confining the roller against lateral movement; also the temporary deformation of the tape caused by the ridge is not needed in machines where the tape advancing means operates by drawing or pulling the leading end of the tape (as contrasted with projecting or thrusting an unsupported free end from a point behind such end). Thus in some constructions embodying this invention, the ridge 44 may be eliminated, as well as the groove 45 in the roller 42 and the groove 48 in the finger 25.

The spring 46 is not always necessary since the retraction or downward pull of the tape between the anchoring roller 42 and the platen face 21 is usually sufficient to seat the roller and stop further retraction of the tape.

The terms "top," "horizontal," "vertical," "upward," "forward" and the like, are relative terms and not limiting because the device of this invention may be operated in any position.

Two machines may be placed near together, on their ends or sides or otherwise positioned, with their tops 52 facing each other, as shown in Figure 12, or in an angular position to each other, to permit objects that are passed between them to be sealed on two different edges at one time.

When using the machine of Figures 1 to 12 for dispensing only and not applying, it could be placed on what is here shown to be its "back," with the hinged upper portion of the casing 16 removed, in which position the present top would be the front, the operating lever 34 would be operated by a downward stroke, the platen face would be horizontal, the tape withdrawing roller would reciprocate horizontally, etc.

Dispensing units and sealing units employing movements which embody the principles of this invention may be built into other machines such as machines or apparatus for wrapping, packing, sealing, labeling, marking, etc.

I claim:

1. A pressure-sensitive adhesive tape dispenser having means for holding a supply of tape, means for temporarily anchoring a previously withdrawn unsevered length of tape against retraction, a movable roller member for withdrawing additional tape from the supply by movement through a tape withdrawing stroke against a surface of the previously withdrawn tape at a point between the anchor and the supply, a movable tape gripper positioned to grip the tape at a point beyond the anchor for advancing the withdrawn tape past the anchor, and means for effecting reciprocal movement of the tape withdrawing roller member and of the gripper in one direction through a tape withdrawing stroke and in the opposite direction through a tape advancing stroke.

2. A pressure-sensitive adhesive tape dispenser having means for holding a supply roll of tape, means for temporarily anchoring a previously withdrawn unsevered length of tape against retraction, a movable roller for withdrawing additional tape from the supply by movement through a tape withdrawing stroke against a surface of the previously withdrawn tape at a point between the anchor and the supply, a movable tape gripper positioned to grip the tape at a point beyond the anchor for advancing the withdrawn tape past the anchor, means for effecting reciprocal movement of the gripper and of the tape withdrawing roller, an operating lever and an operative connection between the lever and the reciprocating means for moving the gripper and the tape withdrawing roller in one direction through a tape withdrawing stroke, and spring means for moving the gripper and the tape withdrawing roller in the opposite direction through a tape advancing stroke.

3. The device of claim 2 in which the means for effecting reciprocal movement of the tape withdrawing roller and the gripper comprises a reciprocating arm with the tape withdrawing roller and the gripper mounted on the arm.

4. The device of claim 3 in which the movable gripper comprises a finger pivoted on the arm with a free end of the finger adjacent the tacky side of the withdrawn length of tape and normally in contact therewith, and means for moving the finger outwardly away from the tape and holding it out of contact with the tape during the tape withdrawing stroke.

5. The device of claim 2 in which the tape anchoring means comprises a platen, a roller-seating member positioned in front of the face of the platen in spaced relation thereto, and a movable anchoring roller of a diameter greater than the distance between the face of the platen and the seating member, the anchoring roller resting against the face of the platen and against the seating member in the space between them, the withdrawn tape extending between the face of the platen and the roller with its tacky side contacting the roller.

6. The device of claim 5 with a ridge on the platen face opposite the anchoring roller, the ridge extending longitudinally in respect to the tape and the roller being shaped to accommodate the ridge.

7. The device of claim 2 with applier means comprising a tape pressing member on the operating lever adjacent the back of the withdrawn length of tape, and means for severing a leading portion of the said length.

8. The device of claim 2 with applier means comprising a tape pressing member on the operating lever adjacent the back of the withdrawn length of tape, means for severing a leading portion of the said length, a guide table that is pierced with an elongate aperture, the operating lever extending outwardly through the aperture beyond the outer surface of the table with the pressing member in position to be engaged by an article being advanced along the table, with the tape between the pressing member and the article.

9. The device of claim 8 in which the severing means is a severing edge positioned to engage the withdrawn length of tape as the tape is moved by pressure of the advancing article against the tape pressing member with the tape between the pressing member and the article.

10. A pressure-sensitive adhesive tape dispenser comprising means for holding a supply roll of tape, a fixed platen in front of the supply roll, a rotatable tape anchoring roller adjacent the face of the platen for holding captive against retraction a previously withdrawn unsevered length of tape that extends forwardly from the supply roll under the platen and thence upwardly along the face of the platen between the anchoring roller and the platen with its tacky side contacting the anchoring roller, a vertical ridge on the face of the platen opposite the anchoring roller, the anchoring roller being shaped to accommodate the ridge, a downwardly and upwardly reciprocating arm pivoted at its rear end and extending forwardly towards a point near the platen, a tape withdrawing roller rotatably mounted on a forward portion of the arm in position to contact the non-tacky side of the withdrawn portion of the tape at a point between the supply roll and the anchoring roller, a vertical tape gripping finger pivotally mounted for forward and backward reciprocal movement on the forward end of the reciprocating arm with an upper free end of the finger normally bearing against the tacky side of the tape at a point between the anchoring roller and the leading end of the tape and being shaped to accommodate the ridge on the platen face, an operating lever and an operative connection between the lever and the reciprocating arm for moving the arm downwardly through a tape withdrawing stroke, spring means for moving the arm upwardly through a tape advancing stroke, cam means for moving the upper free end of the tape-gripping finger forwardly away from the tape and holding it out of contact with the tape during the tape withdrawing stroke, and means for severing a leading portion of the tape.

11. The device of claim 10 with applier means comprising a tape pressing member on the operating lever adjacent the back of the withdrawn length of tape.

12. The device of claim 10 with applier means comprising a tape pressing member on the operating lever adjacent the back of the withdrawn length of tape, a guide table that is pierced with an elongate aperture, the operating lever extending upwardly through the aperture above the upper surface of the table with the pressing member in position to be engaged by an article being advanced across the table, with the tape between the pressing member and the article.

13. The device of claim 12 in which the severing means is a severing edge positioned to engage the withdrawn length of tape as the tape is moved by pressure of the advancing article against the tape pressing member with the tape between the pressing member and the article.

SETH B. LINDSEY.

REFERENCES CITED

The following references are of record in the file of this patent:

UNITED STATES PATENTS

| Number | Name | Date |
| --- | --- | --- |
| 1,074,607 | Coe et al. | Oct. 7, 1913 |
| 1,734,317 | White | Nov. 5, 1929 |
| 1,750,396 | Evans | Mar. 11, 1930 |
| 1,941,597 | Cavagnaro | Jan. 2, 1934 |
| 2,266,362 | Forster | Dec. 16, 1941 |
| 2,317,943 | Salfisberg | Apr. 27, 1943 |
| 2,363,277 | Anderson | Nov. 21, 1944 |
| 2,382,406 | Engberg | Aug. 14, 1945 |
| 2,404,317 | Salfisberg | July 16, 1946 |
| 2,407,641 | Anderson | Sept. 17, 1946 |